US009152485B2

(12) United States Patent
Bird et al.

(10) Patent No.: US 9,152,485 B2
(45) Date of Patent: *Oct. 6, 2015

(54) EVALUATING SERVICE DEGRADATION RISK FOR A SERVICE PROVIDED BY DATA PROCESSING RESOURCES

(71) Applicant: International Business Machines Corporation, Armonk, NY (US)

(72) Inventors: John J. Bird, Rochester, MN (US); Terry R. Ulmer, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/705,496

(22) Filed: Dec. 5, 2012

(65) Prior Publication Data

US 2014/0157061 A1 Jun. 5, 2014

(51) Int. Cl.
*G06F 11/00* (2006.01)
*G06F 11/34* (2006.01)

(52) U.S. Cl.
CPC .......... *G06F 11/008* (2013.01); *G06F 11/3495* (2013.01)

(58) Field of Classification Search
CPC ...... G06F 11/30; G06F 11/34; G06F 11/3495
USPC ....................................................... 714/47.3
See application file for complete search history.

(56) References Cited

U.S. PATENT DOCUMENTS

| | | | |
|---|---|---|---|
| 6,557,120 B1 | 4/2003 | Nicholson et al. | |
| 6,802,020 B1 * | 10/2004 | Smith | 714/4.2 |
| 7,107,491 B2 * | 9/2006 | Graichen et al. | 714/37 |
| 7,225,362 B2 * | 5/2007 | Deily et al. | 714/38.11 |
| 7,464,119 B1 | 12/2008 | Akram et al. | |
| 7,668,917 B2 | 2/2010 | Netsch et al. | |
| 7,975,185 B2 * | 7/2011 | Kaefer et al. | 714/47.1 |
| 8,769,349 B2 * | 7/2014 | Gotesdyner et al. | 714/47.3 |
| 2004/0260703 A1 | 12/2004 | Elkins et al. | |
| 2005/0138111 A1 * | 6/2005 | Aton et al. | 709/201 |
| 2009/0030751 A1 | 1/2009 | Barve et al. | |
| 2010/0318395 A1 | 12/2010 | Corneil et al. | |
| 2013/0198370 A1 | 8/2013 | Aguchi et al. | |
| 2014/0157061 A1 * | 6/2014 | Bird et al. | 714/47.1 |
| 2014/0157062 A1 * | 6/2014 | Bird et al. | 714/47.1 |
| 2014/0157063 A1 * | 6/2014 | Bird et al. | 714/47.3 |
| 2014/0157235 A1 * | 6/2014 | Bird et al. | 717/121 |

* cited by examiner

*Primary Examiner* — Philip Guyton
(74) *Attorney, Agent, or Firm* — Roy W. Truelson

(57) ABSTRACT

In one aspect, a service requirements specification specifies data processing resources required to provide a service, and a configuration specification specifies a configuration of data processing resources for providing the service. The service requirements specification and configuration specification are analyzed using resource reliability data for the specified resources to determine a composite risk of degradation of the service. In another aspect, reliability of one or more software modules is projected according to a current state in a development life cycle of the software modules and any of various additional indicators. Preferably, a data processing support provider separate from the service-providing enterprise maintains historical field support data concerning significant field defect events with respect to various resources, and uses this data for projecting reliability of the resources.

19 Claims, 9 Drawing Sheets

EVALUATING SERVICE DEGRADATION RISK FOR A SERVICE PROVIDED BY DATA PROCESSING RESOURCES

FIELD OF THE INVENTION

The present invention relates to digital data processing, and in particular to the evaluation of risk of failures, outages, defects or other problems associated with the use of digital data processing devices.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is no economically feasible to manipulate via computer. The reduced cost of information processing drives increasing productivity in a snowballing effect, because product designs, manufacturing processes, resource scheduling, administrative chores, and many other tasks, are made more efficient.

With respect to the widespread use of digital data technology, two observations may be made. First, digital data processing systems have become, and continue to become, increasingly complex. This complexity applies not only to individual digital devices, but as is well known, digital devices are commonly connected to other digital devices in networks, so that a digital data processing system may be viewed as a single device or as a collection of devices communicating via one or more networks. Second, users, from schoolchildren to multi-national corporations, are increasingly dependent on the digital data processing systems they use.

Given the dependencies on data processing systems that users feel, there is a hope and expectation, which translates to a marketplace demand, for more reliable digital data systems. From the standpoint of the user, this demand is focused on the dependability of the system to perform some set of functions necessary to the user, i.e. to perform one or more services for the user. In general, as long as the service continues to be performed, the user is not greatly concerned about the details of irregularities occurring within the digital data system. Nor is the user greatly mollified by the news that the system is operating properly, if in fact the service is not being performed as expected.

Of course, one piece of the complex puzzle of reliability is the reliability of individual hardware components of a digital data system. A great deal of effort has been directed to the design of more reliable data processing hardware components and component assemblies, and it must be conceded that great progress has been made in this field. Additionally, effort has been directed to the detection of actual or impending failures of components, and the replacement or substitution of function thereof with minimal disruption to the operation of a larger data processing system of which the component is a part.

For any given data processing component, reliability can be further improved by redundancy, i.e., providing multiple components of the same type which perform the same function, and which are configured so that in the event any single component fails to perform its intended function, the remaining component or components can act in its place.

However, it is difficult to ascertain and guarantee reliability of large and complex data processing systems or networks of systems to perform some service which a user may expect. Although reliability of some individual hardware components may be known or assured, the very complexity of the system may make it difficult to identify the weakest link in the set of components needed to provide the service. Furthermore, while hardware components have greatly improved and redundancy may provide even further hardware reliability, the service will often be dependent on critical paths in software which is common to all computer processors or systems providing the service. Defects in the software are notoriously difficult to predict, and mere redundant hardware components will not necessarily prevent service interruption as a result.

A need exists, not necessarily recognized, for improved methods and systems for evaluating risk of service degradation where a service is provided by data processing resources, and particularly by a complex set of hardware and software resources coupled by one or more networks.

SUMMARY

In a first aspect, a service requirements specification specifies multiple digital data processing resources required to provide a service on behalf of a client, and a configuration specification specifies a configuration of digital data processing resources to be used to provide the service. The service requirements specification and configuration specification are analyzed using resource reliability data for the specified resources to determine a composite risk of degradation of the service.

In a second aspect, reliability of one or more software modules is projected according to a current state in a development life cycle of the one or more software modules and any of various additional indicators from past experience, either with the one or more software modules or other software modules.

In a third aspect, field support data gathered from supporting one or more digital data resource types is used to evaluate risk of degradation of a service provided by digital data resources of the same type.

In a preferred embodiment incorporating these various aspects, configuration of multiple hardware and software digital data processing resources for providing a service is defined in a configuration specification, which is a digital record stored on a computer. The resources required to provide the service are further defined in a service specification, which is also a digital record. The service is preferably a service supporting the operation of a service-providing enterprise, such as a for-profit business, non-profit, or governmental entity, and upon which it is dependent. In an exemplary embodiment, the service may be the maintenance and operation of a web site having one or more web pages for access by customers of a service-providing enterprise to transact business with the enterprise. The digital data processing resources required to provide such a service may include, for example, one or more general purpose computer systems, one or more application programs which execute on the computer systems to support the operation of the web site and the maintenance of customer data, one or more gateways, routers, or other devices for connecting the computer system(s) to the Internet, storage devices for storing essential data, maintenance, backup, and failure recovery hardware and software, and so forth. A data processing support provider, which is preferably a business entity separate from the service-providing enterprise, maintains historical field support data concerning significant field defect events (hardware failures, software bugs, network outages, intermittent error, etc.) with respect to various digital data processing systems and components, this data being obtained generally from users of the corresponding types of digital data processing hardware and software, such as customers of the data processing support provider (and not limited to data derived from the web enterprise). In particular, the data processing support provider preferably projects software reliability at particular times or stages in the development life cycle of one or more software modules, such as percentage of time software is not operational due to unknown software defects or other causes, using historical software defect data obtained from the life cycles subject software modules and/or of other software modules. The data processing support provider maintains an automated analytical program which analyzes the configuration specification, the service specification, and the defect data to produce an estimated risk of degradation of the service specified in the service specification.

The configuration specification could specify an actual existing configuration or a hypothetical configuration resulting from a modification to an existing configuration or an entirely new installation. Similarly, the service specification could specify a currently provided service or a hypothetical service to be provided in the future.

By evaluating and present risk of service loss, information is presented in a form which is much more useful to an enterprise which is dependent on the service. Such information can be used by the enterprise, for example, to determine whether to introduce hypothetical changes to the digital data processing resources which provide the service, to determine whether a need exists for greater redundancy or other capabilities of the digital data processing resources, to quantify risk for financial and contractual purposes, and so forth.

The details of the present invention, both as to its structure and operation, can best be understood in reference to the accompanying drawings, in which like reference numerals refer to like parts, and in which:

DETAILED DESCRIPTION

Figure 1:
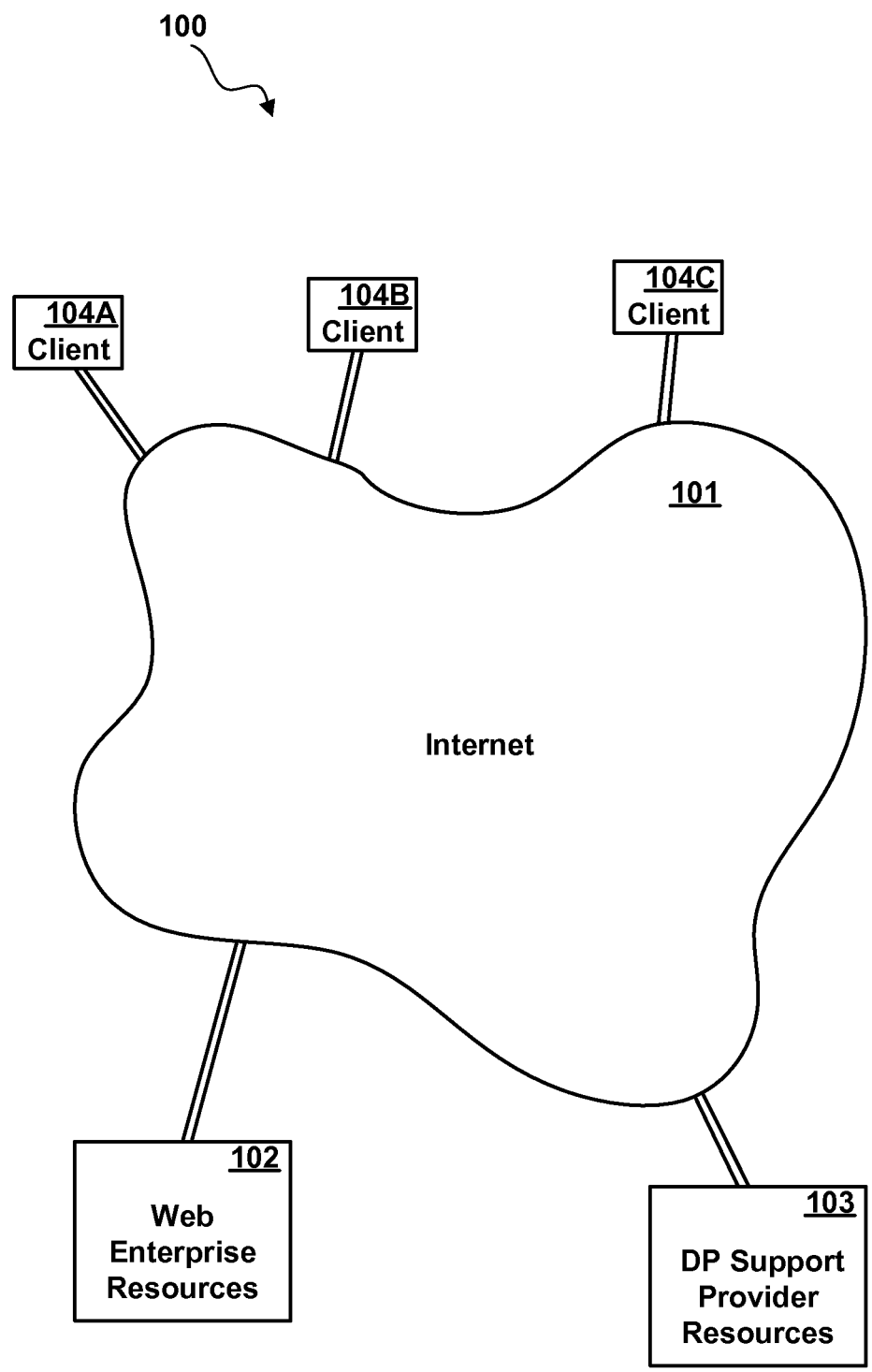
FIG. 1 is a high-level conceptual illustration of a networked computer system environment for evaluating service degradation risk, according to the preferred embodiment of the present invention.

Referring to the Drawing, wherein like numbers denote like parts throughout the several views, FIG. 1 is a high-level conceptual representation of a networked computer system environment 100 for evaluating service degradation risk, according to one or more preferred embodiments of the present invention. The environment includes a network (or collection of networks) 101, which is preferably the Internet, although other networks or collections of networks could alternatively be used. A set of data processing resources 102 of a service-providing enterprise is coupled to the network, the set of data processing resources providing a service via the network to a plurality of client devices 104A-C (herein generically referred to as feature 104).

The "service" might be any service provided by a set of data processing resources. In the preferred embodiment in which network 101 is the Internet, the service provided by the set of data processing resources of the service providing enterprise is the presentation of one or more web pages over the Internet and the interactive exchange of data with the client devices 104. For this reason, the set of data processing resources is identified in FIG. 2 and elsewhere herein as "web enterprise resources" and the enterprise which provides the service as the "web enterprise" for ease of understanding. However, it should be understood that the service need not involve the presentation of web pages to clients or the use of the Internet. For example, the service providing enterprise could be a cell phone provider which provides cell phone voice and/or data service over a cell phone network. The service may involve electronic transactions supporting the sale of goods or services to the clients, whereby the clients directly pay the enterprise, or may involve services provided without charge to the clients and which could, e.g., be funded by one or more third parties, such as advertisers. Furthermore, it should be understood that the clients need not be external to the enterprise providing the service, and could alternatively be employees of the enterprise, and that the client devices may be coupled to the set of data processing resources 102 via the Internet or via one or more internal networks of the enterprise or otherwise. Furthermore, while "client devices" are typically understood to mean digital data processing devices (such as workstations) under the control of a human user client, the set of data processing resources 102 could be used to control automated machinery without human interaction, such as a process control system for a manufacturing facility, oil refinery, or the like. While three client devices 104A-C are shown in FIG. 1 for illustrative purposes, it will be understood that the actual number may vary, and is often much larger.

Additionally coupled to network 101 is a set of data processing support provider resources 103 which provide data processing support for web enterprise resources 102. Such support could include any of various data processing support services, such as sale or lease of hardware, licensing of software, maintenance of hardware and/or software, monitoring of performance and system components, backup of data, and consulting services. In particular, in accordance with the preferred embodiment, data processing support provider evaluates risk of degradation of the service provided by web enterprise resources 102, as disclosed in greater detail herein. Data processing support provider resources 103 preferably includes at least one support provider computer system coupled to network 101 and in communication with web enterprise resources 102, and would typically include multiple such systems in a configuration having substantial redundancy to reduce the probability of support service outage. In the preferred embodiment, data processing support provider resources are under the direction and control of a business entity separate from the web enterprise; however, data processing support provider resources could alternatively be internal to the web enterprise.

Figure 2:
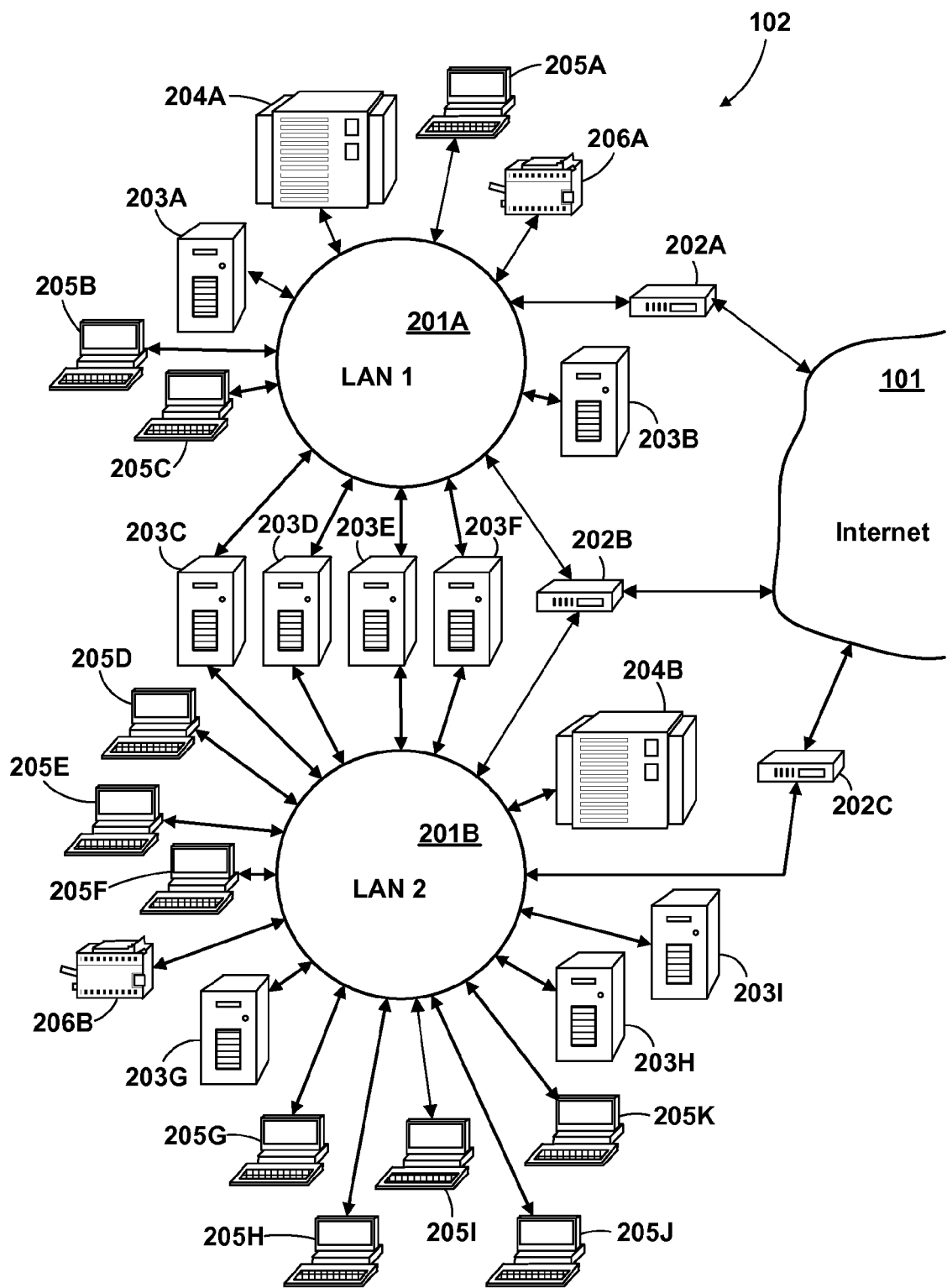
FIG. 2 is a high-level illustration of the major components of a representative data processing resource set for which service degradation risk is evaluated, in accordance with the preferred embodiment

FIG. 2 is a high-level illustration of the major components of a representative data processing resource set 102 for which service degradation risk is evaluated, in accordance with one or more preferred embodiments. As shown in FIG. 2, the set of data processing resources contains local area networks (LANs) 201A-B (herein generically referred to as feature 201), of which two are illustrated in FIG. 2, it being understood that the number could vary. The LANs communicate with the Internet 101 through routers 202A-C (herein generically referred to as feature 202), of which three are illustrated in FIG. 2, it being understood that the number could vary. Multiple digital data processing devices are connected to one or more of the LANs. As illustrated in FIG. 2, such data processing devices may include server computer systems 203A-I (herein generically referred to as feature 203), disk array storage subsystems 204A-B (herein generically referred to as feature 204), workstations 205A-K (herein generically referred to as feature 205), and printers 206A-B (herein generically referred to as feature 206).

LANs 201 may comprise any communications medium which allows digital devices to communicate with other devices, either directly through the network or remotely through Internet 101. For example, a network 201 might be an Ethernet or a Token Ring LAN, as might typically be the case in a business enterprise having multiple internal nodes which communicate with each other, and which have an external connection through one or more routers 202 to the Internet. Although networks 201 are described in the exemplary embodiment herein as local area networks (LANs), they are not necessarily local area networks, and could take some other form. For example, a network could be the telephone system, or a radio frequency transmission medium, or any of various other communications media. Additionally, although for simplicity a single router 202A, 202C is shown coupling each network 201 to the Internet, and a third router 202B couples both networks to the Internet, the actual configuration may vary, additional redundancy may exist, and some routers may be used only to couple networks to one another, without a connection to the Internet. Finally, although it is preferred that networks 201 be coupled directly or indirectly to the Internet, the present invention is not limited to use on networks coupled to the Internet.

Server computer systems 203 are preferably general purpose computer systems having multi-tasking operating systems, at least some of which execute software programs for providing the service provided by the web enterprise to clients, i.e., for receiving requests from client devices 104 and generating responses to the client requests in the form of web pages or other data, interactively transacting business with the client devices, and so forth. Preferably, multiple such server computer systems execute common software programs to provide redundancy. As illustrated, some of these server systems 203C-F are coupled to both LANs 201A, 201B, so that redundant network connections are provided. Disk arrays storage subsystems 204 provide mass storage of essential data, such as storage of transactions and account information for clients of the web enterprise. Storage subsystems 204A and 204B may, for example, be identically configured subsystems storing mirrored copies of the same data, so that the web enterprise is protected from essential data loss or unavailability. Workstations 205 are for use of employees of the web enterprise and provide access to server computer systems 203 and storage subsystems 204 for access to data, changes to the web site presented to clients, administrative tasks, and so forth.

Although a particular configuration of data processing resources including a pair of networks, three routers, and multiple attached devices, is shown in the simplified illustration of FIG. 2, it will be understood that the actual number and type of such components may vary, and could be either more or less complex, and that other or additional components not shown may be present.

Figure 3:
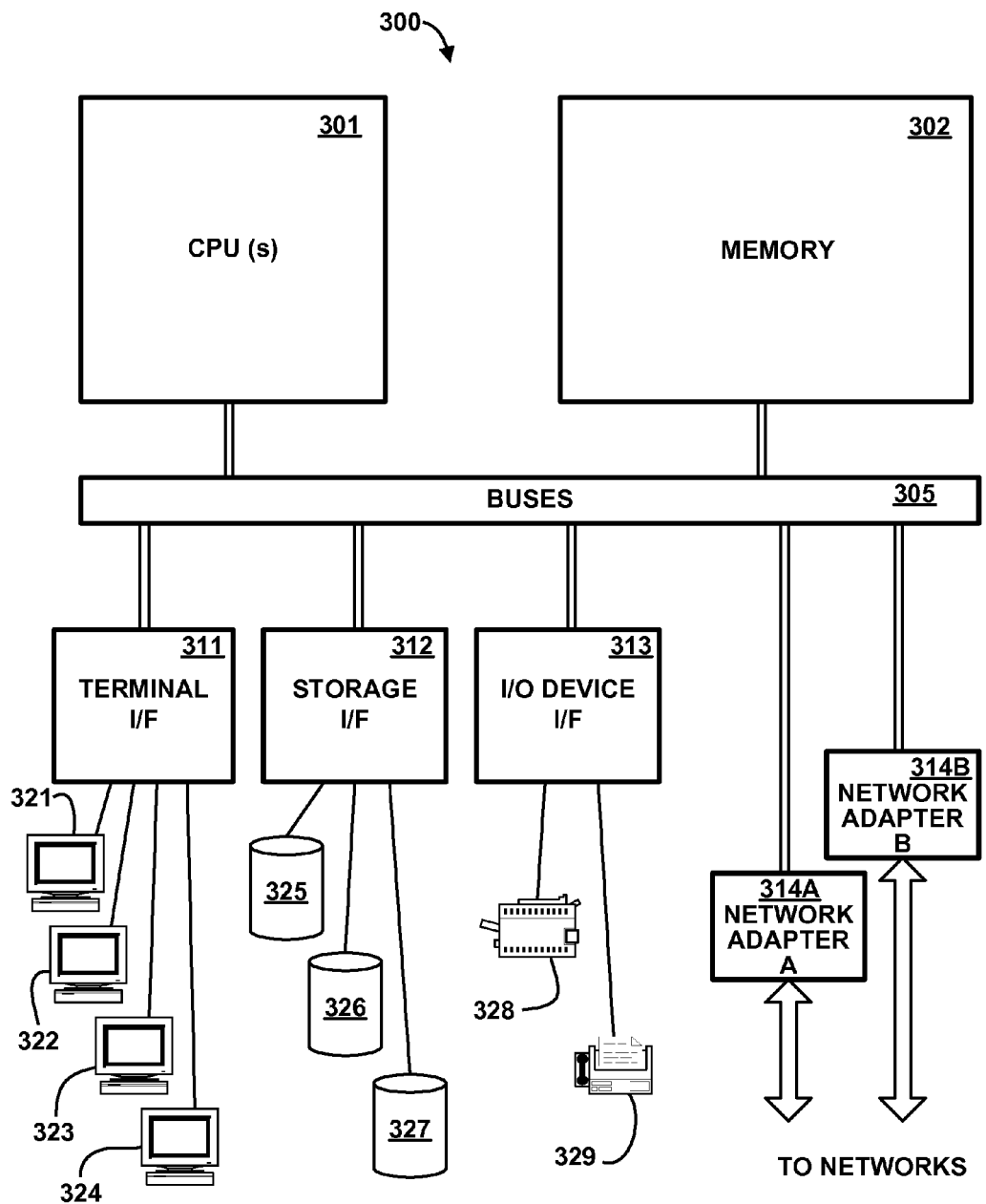
FIG. 3 is a high-level block diagram of the major hardware components of a representative data processing support provider computer system for evaluating service degradation risk, according to the preferred embodiment.

FIG. 3 is a high-level block diagram of the major hardware components of a representative data processing support provider computer system 300 for evaluating service degradation risk, according to the preferred embodiment. System 300 is part of the set of data processing support provider resources 103 illustrated in FIG. 1, and may constitute the only computer system contained in support provider resources 103, although a support provider will typically have multiple systems.

Support provider system 300 includes at least one general-purpose programmable processor (CPU) 301 which executes instructions and processes data from main memory 302. Main memory 302 is preferably a random access memory using any of various memory technologies, in which data is loaded from storage or otherwise for processing by CPU 301.

One or more communications buses 305 provide a data communication path for transferring data among server CPU 301, main memory 302 and various I/O interface units 311, 312, 313, 314A, 314B, which may also be known as I/O processors (IOPs) or I/O adapters (IOAs). The I/O interface units support communication with a variety of storage and I/O devices. For example, terminal interface unit 311 supports the attachment of one or more user terminals 321-324. Storage interface unit 312 supports the attachment of one or more direct access storage devices (DASD) 325-327 (which are typically rotating magnetic disk drive storage devices, although they could alternatively be other devices, including arrays of disk drives configured to appear as a single large storage device to a host). I/O device interface unit 313 supports the attachment of any of various other types of I/O devices, such as printer 328 and fax machine 329, it being understood that other or additional types of I/O devices could be used. Network interfaces 314A, 314B support connections to one or more external networks for communication with one or more other digital devices, and specifically for communication with data processing resources 102. Such external networks preferably include the Internet, and may include one or more intermediate networks, such as local area networks (not shown), through which communication with the Internet is effected.

It should be understood that FIG. 3 is intended to depict the representative major components of support provider system 300 at a high level, that individual components may have greater complexity than represented in FIG. 3, that components other than or in addition to those shown in FIG. 3 may be present, and that the number, type and configuration of such components may vary, and that a large support provider computer system will typically have more components than represented in FIG. 3. Several particular examples of such additional complexity or additional variations are disclosed herein, it being understood that these are by way of example only and are not necessarily the only such variations.

Although only a single CPU 301 is shown for illustrative purposes in FIG. 3, support provider system 300 may contain multiple CPUs, as is known in the art. Although main memory 302 is shown in FIG. 3 as a single monolithic entity, memory 302 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 305 are shown in FIG. 3 as a single entity, in fact communications among various system components is typically accomplished through a complex hierarchy of buses, interfaces, and so forth, in which higher-speed paths are used for communications between CPU 301 and memory 302, and lower speed paths are used for communications with I/O interface units 311-314. Buses 305 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 305 from various communications paths running to the various I/O devices, it would alternatively be possible to connect some or all of the I/O devices directly to one or more system buses.

Support provider system 300 depicted in FIG. 3 has multiple attached terminals 321-324, such as might be typical of a multi-user "mainframe" computer system. Typically, in such a case the actual number of attached devices is greater than those shown in FIG. 3, although the present invention is not limited to systems of any particular size. Support provider system 300 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, support provider system 300 is a multi-user computer system, such as a computer system based on the IBM i/Series™ architecture, it being understood that the present invention could be implemented on other computer systems.

Figure 4:
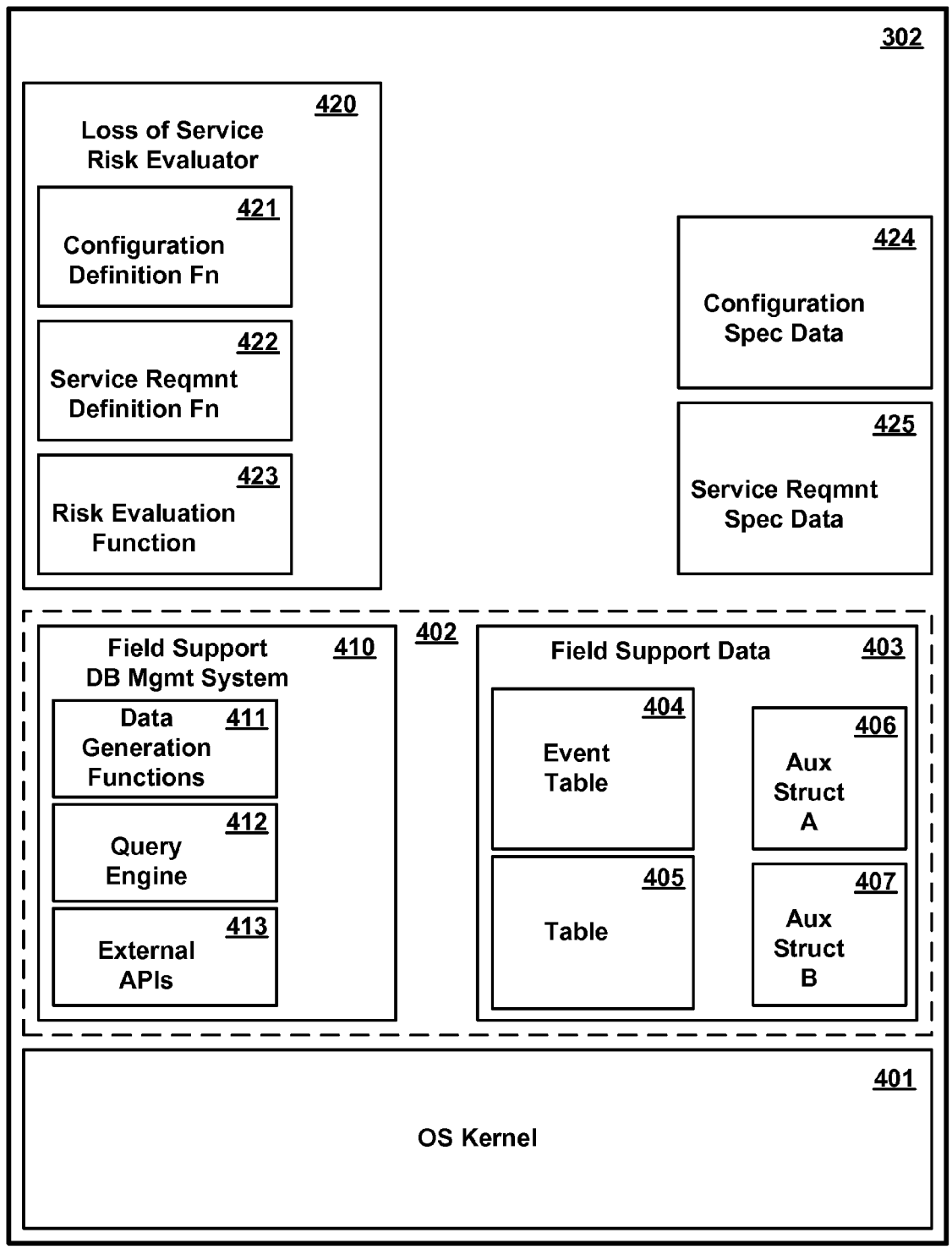
FIG. 4 is a conceptual illustration of the major software components of the data processing support provider computer system of FIG. 3, according to the preferred embodiment.

FIG. 4 is a conceptual illustration of the major software components of data processing support provider system 300 in memory 302. Operating system kernel 401 is executable code and state data providing various low-level software functions, such as device interfaces, management of memory pages, management and dispatching of multiple tasks, etc. as is well-known in the art. A structured field support database 402 contains field support data and database management software relating to support activities for digital data devices supported by data processing support provider 103, which is maintained by system 300 and for which the system provides access to one or more users, who may be directly attached to system 300 or may be remote clients who access system 100 through a network using a client/server access protocol.

Database 402 contains field support data 403 such as one or more tables 404-405 (of which two is shown in FIG. 4, it being understood that the number may vary), each having a plurality of entries or records, each entry containing at least one (and usually many) fields, as is well known in the art. A database table 404-405 might contain almost any type of data useful for providing support of digital data systems in use in the field. In particular, preferably at least one table is an event table 404 containing records of historical field service events, such as failures, defects, and other service interruptions occurring while supported digital data systems are in use, each record identifying the nature of the corresponding event, time of the event, and the affected digital data processing resource, such as a hardware component or a software module. Associated with the database tables are one or more auxiliary data structures 406-407, also sometimes referred to as metadata (of which two are represented in FIG. 4, it being understood that the number of such structures may vary). Auxiliary data structures characterize the structure of the database and data therein, and are useful in various tasks involved in database management, particularly in executing queries against the database. Examples of auxiliary data structures include database indexes, materialized query tables, histograms, index advice record, and so forth, it being understood that other types of metadata may exist.

Field support database management system is executable computer programming code which executes on CPU 301 to provide basic functions for the management of database 402. Database management system 410 may theoretically support an arbitrary number of database tables, which may or may not have related information, although only two tables are shown in FIG. 4. Database management system 410 preferably allows users to perform basic database operations, such as defining a database, altering the definition of the database, creating, editing and removing records in the database, viewing records in the database, defining database auxiliary data structures such as indexes and materialized query tables, and so forth. Among the functions supported by database management system 410 is at least one data generating function 411 for creating and editing records in database tables 404-405. Data generating function 411 preferably includes the ability to manually create and edit records in database tables 404-405, but in particular also preferably includes the ability to import records from external sources, including records stored external to system 300. In one or more variations of the preferred embodiment, field support data is generated in the first instance on one or more external support systems, and imported to system 300. Database management system 410 preferably further includes a query engine 412 for executing queries against data in database tables 404-405. Database management system further preferably includes an external interface 413 having one or more application programming interfaces (APIs) by which external applications can access data in field support data 403, either by invoking query engine 412 or through other means. Database management system 410 may further contain any of various more advanced database functions, as are known in the art. In the preferred embodiment, database management system 410 is a generic database management system implementing a structured query language (SQL) query protocol, it being understood that a database management system might alternatively query and structure data according to some other protocol and/or that it might be a custom designed database management system. Although database management system 410 is represented in FIG. 4 as an entity separate from operating system kernel 401, it will be understood that in some computer architectures various database management functions are integrated with the operating system.

Although one database 402 having two database tables 405-405 and two auxiliary structures 406-407 are shown in FIG. 4, the number of such entities may vary, and could be much larger. The computer system may contain multiple databases, each database may contain multiple tables, and each database may have associated with it multiple indexes, MQTs, histograms, or other auxiliary data structures not illustrated. Additionally, database 402 may be logically part of a larger distributed database which is stored on multiple computer systems. Although database management system 410 is represented in FIG. 4 as part of database 402, the database management system, being executable code, is sometimes considered an entity separate from the "database", i.e., the data.

System 300 further includes loss of service risk evaluator 420. Risk evaluator 420 is a set of computer programs or functions (i.e., executable computer programming code which execute on CPU 301) providing basic functions for the management of certain data structures used in evaluating loss of service risk and generating loss of service risk analyses using the data in those data structures as well as field support data 403. In particular, risk evaluator includes a configuration definition function 421, a service requirements definition function 422, and a risk evaluation function 423.

Configuration definition function 412 is used for generating configuration specifications 424, each specification defining a configuration of data processing resources to be evaluated. Configuration definition function 412 preferably supports manual input of data to define a configuration, but further preferably supports importing of configuration data from one or more external sources. It will be appreciated that configuration data for complex digital data systems is typically maintained somewhere, often on the systems themselves, and importing such data is far more efficient and less prone to error than manual entry. Service requirements definition function 413 is used for generating service requirements specifications 425 for actual or hypothetical services to be provided by a set of digital data processing resources. Like the configuration definition function, service requirements definition function 413 preferably supports manual input of data to specify service requirements as well as importing of such service requirements specification data from one or more external sources. However, service requirements are less often pre-defined than configurations, and so manual entry may sometimes be necessary. Risk evaluation function 423 accesses a configuration specification in configuration specification data 424 and a service requirements specification in service requirement specification data 425 to evaluate the risk of loss of service for the service specified by the service requirement specification data if the service is provided by the configuration of data processing resources specified by the configuration specification, as explained in further detail herein. In order to evaluate risk, risk evaluation function also accesses field support data 403 through one or more external APIs 413 to database 402.

In addition to database management system 410 and loss of service risk evaluator 420, one or more user applications (not shown) may access data in database tables 203-205 to perform tasks on behalf of one or more users, and may use defined auxiliary database structures to do so. Such user applications may execute on computer system 300, or may access the database from remote systems. Such user applications may include, e.g., accounting applications which allocate charges for services provided, code development and engineering applications which provide feedback to programmers, engineers and other concerning field support events, or any of various other applications which may have use for the data.

Various software entities are represented in FIG. 4 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 4, it will be understood that the actual number of such entities may vary, and in particular, that in a complex database environment, the number and complexity of such entities is typically much larger. Additionally, although software components 402-407, 410-413, and 420-425 are depicted in FIG. 4 on a single computer system 300 for completeness of the representation, it is not necessarily true that all programs, functions and data will be present on a single computer system or will be performed on a single computer system. In particular, loss of service risk evaluator 420 and/or associated data or functions could be located on a system separate from database 402, the data in field support database 402 being accessed remotely by loss of service risk evaluator 420.

While the software components of FIG. 4 are shown conceptually as residing in memory 302, it will be understood that in general the memory of a computer system will be too small to hold all programs and data simultaneously, and that information is typically stored in data storage devices 325-327, comprising one or more mass storage devices such as rotating magnetic disk drives, and that the information is paged into memory by the operating system kernel 401 as required. In particular, database tables 404-405 are typically much too large to be loaded into memory, and typically only a small portion of the total number of database records is loaded into memory at any one time. The full database 402 is typically recorded in disk storage 325-327. Furthermore, it will be understood that the conceptual representation of FIG. 4 is not meant to imply any particular memory organizational model, and that system 300 might employ a single address space virtual memory, or might employ multiple virtual address spaces which overlap.

Figure 5:
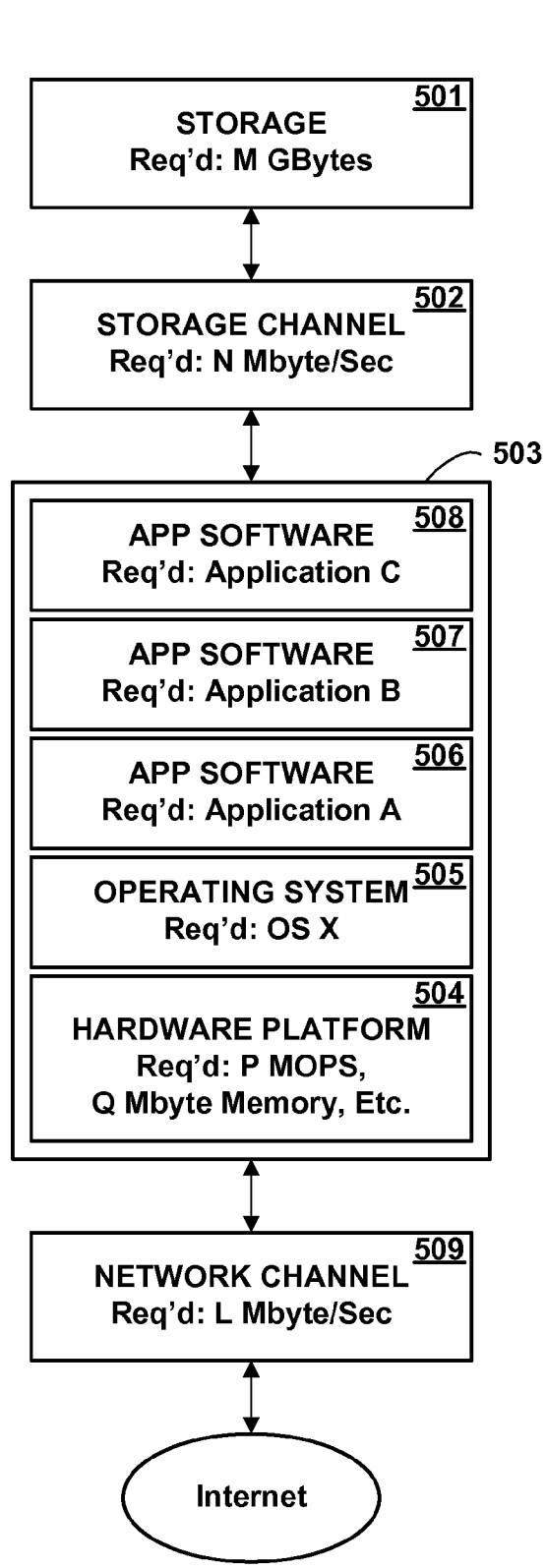
FIG. 5 is a conceptual illustration showing in greater detail a structure of an illustrative instance of service requirement specification data, according to the preferred embodiment.

FIG. 5 is a conceptual illustration showing in greater detail a structure of an illustrative instance of service requirement specification data 425, according to the preferred embodiment. Service requirement specification data is an abstract definition of a data processing system for providing the service. Ideally, this is a specification of a minimally adequate system, i.e., a system having minimally adequate resources for providing the service. These minimally adequate resources do not necessarily correspond to the actual resources available; in fact, it is often preferred that the actual resource exceed those minimally adequate requirements to provide a margin of safety in the event one or more resources malfunctions or is otherwise unavailable. Service requirement specification data may be stored in one or more files and loaded into memory in any appropriate form of one or more defined data structures.

As shown in FIG. 5, service requirement specification data contains multiple abstract resource definitions, such as: storage definition 501, storage channel definition 502; core definition 503 containing hardware platform definition 504, operating system definition 505, and application program definitions 506-508; and network channel definition 509. Each abstract resource definition contains a resource requirement for the corresponding resource. For example, an abstract storage resource definition 501 may specify an amount of required storage capacity, e.g., as gigabytes (Gbytes) of storage, or any other appropriate measure. The storage channel definition 502 may specify a required bandwidth of data transferred between the core and storage, e.g., as megabytes (Mbytes) per second, or any other appropriate measure.

The resource definitions for hardware components, i.e. definitions 501, 502, 504, 509 in the illustrative example of FIG. 5, preferably do not specify particular hardware components or configurations, such as particular models of processor or storage device, bus specify required capacities or capabilities of the hardware resource. However, the requirement may alternatively specify particular devices, or some combination of devices and capabilities. For example, because operating systems and software may be sensitive to particular underlying processor hardware, the hardware platform may specify a particular processor or processor family having an aggregate processing capacity of some stated amount. Software resource definitions, i.e., definitions 505-508 in the illustrative example of FIG. 5, will generally specify a particular software product, which could encompass a family of software products (e.g., all versions of a particular product, or all versions of a particular software product above a particular version number).

In actual physical embodiment, the resources specified by a resource definition may be provided by multiple distinct devices. For example, in the exemplary set of data processing resources of FIG. 2, it may be that no single one of servers 203 meets the hardware platform requirements of specified in hardware platform resource definition 504, but that collectively all of servers 203 meet and exceed the requirements. In this case, any consideration of loss of service must take into account the probability that one or more servers, or connections to servers, will fail in such a manner as to reduce the available hardware resource below the minimum specified in the applicable hardware platform resource definition.

FIG. 5 is intended to represent one possible embodiment of a service requirements specification, and it will be understood that many variations are possible, and that other or additional resources may be specified. In particular, resources may be defined with a different specificity. For example, although it is preferred that the service requirements specification specify operational capabilities of certain hardware resources (e.g. number of operations per second of processor resource), it would alternatively be possible to specify a specific number of a particular device (e.g. N processors of XYZ-200 type).

Figure 6:
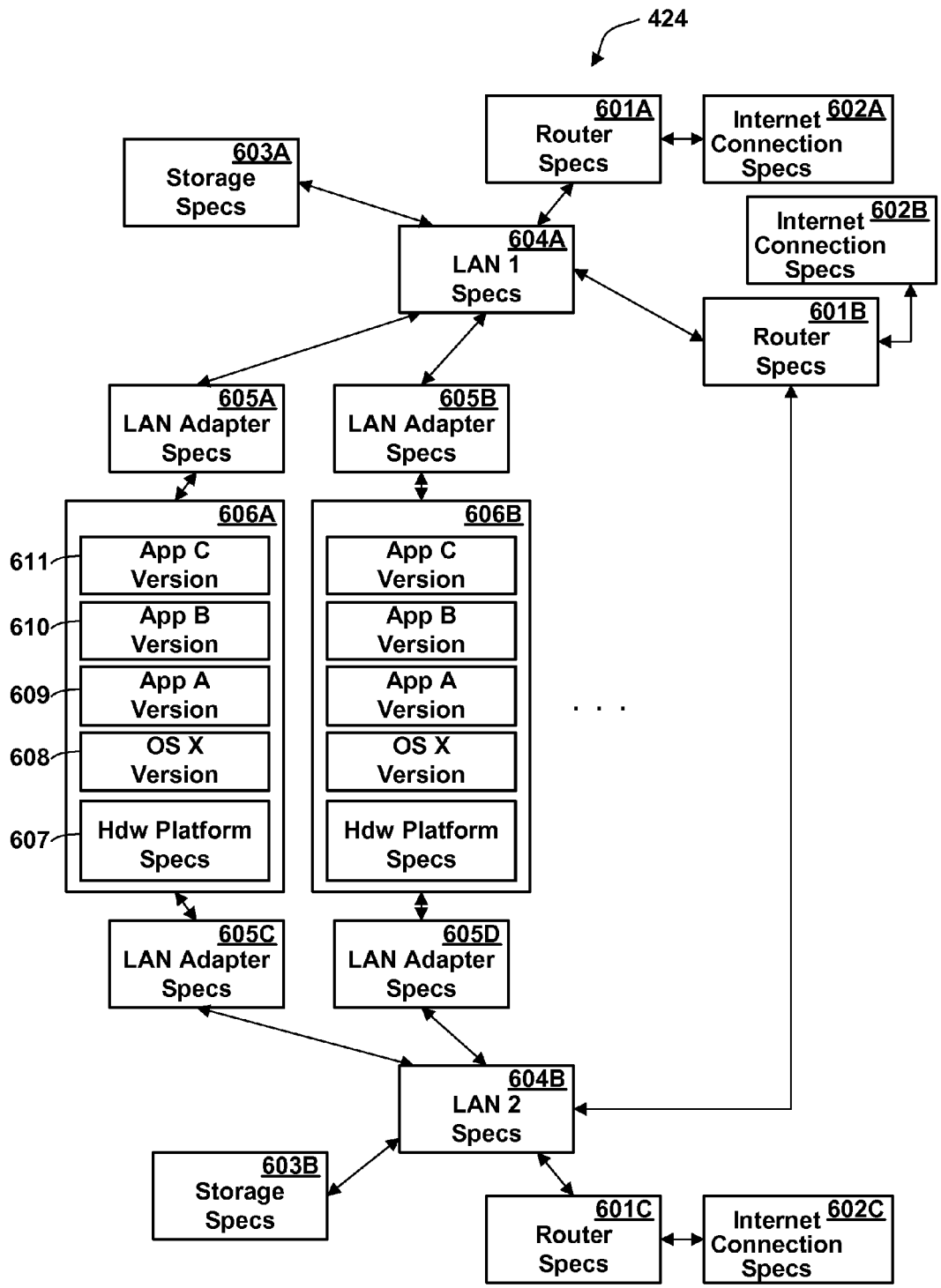
FIG. 6 is a conceptual illustration showing in greater detail a structure of a portion of an illustrative instance of configuration specification data, according to the preferred embodiment.

FIG. 6 is a conceptual illustration showing in greater detail a structure of a portion of an illustrative instance of configuration specification data 424, according to the preferred embodiment. Specifically, FIG. 6 depicts a portion of a configuration specification data structure for the illustrative configuration of FIG. 2. For clarity of illustrations, some portions of data structure 424 for the illustrative configuration of FIG. 2 are not shown.

Referring to FIG. 6, the configuration specification data contains multiple configuration resource definitions, each corresponding to a respective resource of the configuration being represented. The various configuration resource definitions are linked to one another in a topology reflecting the configuration being represented. For example, router resource definitions 601A-C correspond to routers 202A-C, respectively, of FIG. 2; Internet connection resource definitions 602A-C correspond to the Internet connections used by routers 202A-C, respectively; storage resource definitions 603A-B correspond to storage subsystems 204A-B, respectively; LAN resource definitions 604A-B correspond to LANs 201A-B, respectively; core resource definitions 606A-B (herein generically referred to as feature 606) correspond to processor/memory hardware and OS and application software residing in servers 203C-D, respectively; and LAN Adapter resource definitions 605A-D (herein generically referred to as feature 605) correspond to LAN Adapters within servers 203C-D which enable communications with LANs 201A-B. Core resource definitions 606 are repeated for each server 203, with LAN adapter resource definitions 605 configured as appropriate. In the illustrative configuration of FIG. 2, for example, not all servers have connections to both LANs, and therefore some core resource definitions 606 would be associated with only a single LAN adapter resource definition 605.

Each core resource definition further contains multiple component definitions of hardware or software components making up the core. As shown in the example, each core contains a hardware platform resource definition 607, an operating system resource definition 608, and multiple application software resource definitions 609-611.

Each resource definition specifies the essential parameters of the corresponding resource. In the case of an operating system resource definition 608 or application software resource definition 609, 610, 611, the essential parameters typically include an identification of the software, e.g., by name and version number. Hardware resource definitions may identify the resource similarly if data exists elsewhere (e.g., in database 402) containing performance and other essential parameters of the corresponding device. Alternatively, the hardware resource definition may incorporate the essential parameters. As used herein, "hardware resources" refers both to strictly hardware devices and devices which are combinations of hardware and firmware or software, i.e. any device which, for purposes of analyzing risk of service loss as explained herein, is treated as a single, unitary entity. For example, although a router contains both hardware and firmware, for purposes of the analysis herein, a single probability of failure is associated with the router as a whole, and that probability incorporates failure in any component, be it hardware, firmware, or software, which might cause the router to stop performing its essential functions.

Operation of Loss of Service Risk Evaluator

In accordance with the preferred embodiment, loss of service risk evaluator 420 generates both service requirement specification data 425 to define the minimum data processing resource requirements for performing a service and configuration specification data 424 for defining a specific configuration to be evaluated for performing that service, exemplary data structures for such service requirement specification data and configuration specification data being explained above. The loss of service risk evaluator further has access to reliability data with respect to the various resources specified in the configuration specification data. The loss of service risk evaluator analyzes the configuration specification data and associated reliability data to determine a risk that the configuration of data processing resources defined by the configuration specification data will fail to meet the service requirements specified by the service requirements specification data, i.e., a risk that there will be a degradation of the service which is the subject of the service requirements specification data. The operation of the loss of service risk evaluator is described in greater detail below with reference to the accompanying figures.

Figure 7:
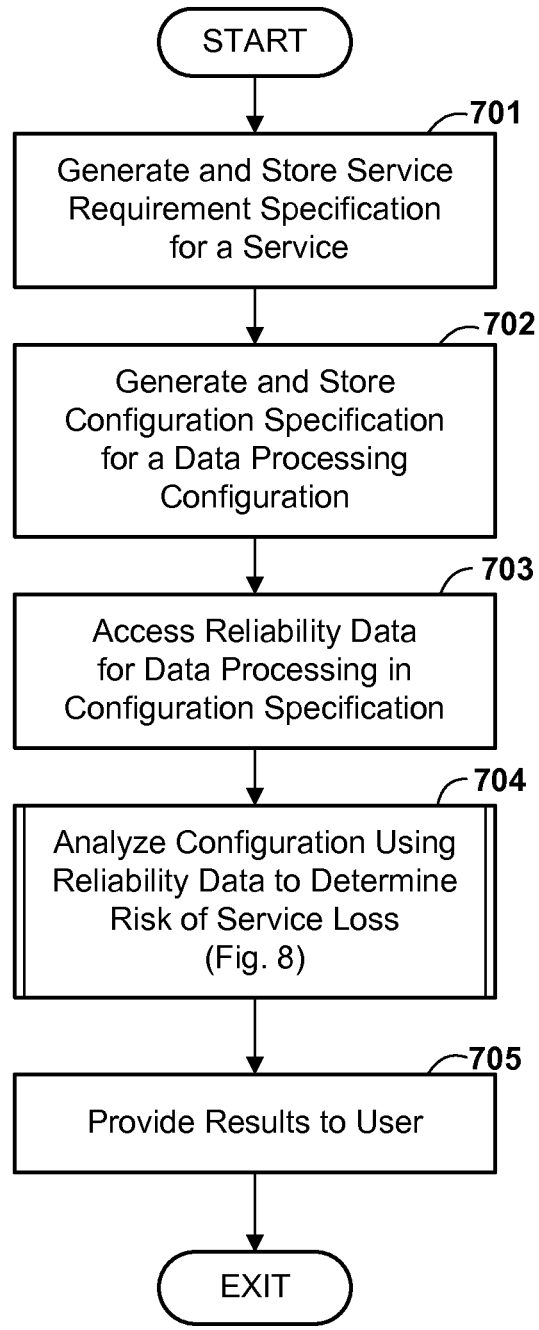
FIG. 7 is a flow diagram illustrating at a high level the actions performed by a data processing support provide to evaluate a risk of service degradation of a data processing service, according to the preferred embodiment.

FIG. 7 is a flow diagram illustrating at a high level the actions performed by a data processing support provider 103, and in particular a loss of service risk evaluator 420 executing within one or more data processing systems of a data processing support provider, to evaluate a risk of service degradation of a data processing service, according to the preferred embodiment. For clarity of description, it will be assumed herein that the essential functions of a data processing support provider execute in a single computer system, although such functions could be distributed.

Referring to FIG. 7, a service requirement definition function 422 generates and records a service requirements specification 425 for a service for which risk is to be evaluated (block 701). The service requirements specification specifies the data processing resources required to provide the service. This specification is preferably in a form as illustrated in FIG. 5 and described above, although any of various alternative representations are possible.

The service for which risk is to be evaluated is a service provided by a set of digital data processing resources on behalf of at least one client. The service is preferably a service supporting the operation of a service-providing enterprise, such as a for-profit business, non-profit, or governmental entity, and upon which it is dependent. The service may be an actual service already being provided, or a hypothetical service, such as one which is the subject of future planning. In an exemplary embodiment, the service may be the maintenance and operation of a web site having one or more web pages for access by customers of a service-providing enterprise to transact business with the enterprise. For example, a service-providing enterprise might be an enterprise which sells goods through an Internet web site; or one which provides financial services through an Internet web site; or one which provides free information which clients consider useful through an Internet web site (such as a search engine), the operation of the web site being funded by advertising displayed to the clients or other means. Many other types of service-providing enterprises are possible. Although the word "client" is used to describe the user of the service, the client need not be an entity separate from the owner or operator of the set of data processing resources, and could be an employee or agent of the owner or operator, or otherwise affiliated with the owner or operator.

Service requirement specification data 425 can be generated in any of several ways. Preferably, service requirement definition function supports at least manual generation of the service requirement specification. I.e., it can present one or more interactive data entry screens to a user for direct input of the various parameters of the service requirement specification. Such manual input could be used either to generate a new service requirement specification from scratch, or to edit a previously generated and saved service requirement specification, e.g. by adding a new software module to the requirement, or increasing the respective value of one or more parameters associated with one or more resources to account for a projected increase in demand.

But while the capability to manually edit a service requirement specification is desirable, it must be recognized that manually specifying all the parameters of a service requirement specification requires considerable expertise in digital data processing technology. Business executives or others knowledgeable about requirements from a business perspective often will not have this type of expertise. Accordingly, in one variation of the preferred embodiment, service requirement definition function additionally supports one or more alternative techniques for generating a service requirement specification.

In one alternative technique, a person knowledgeable with the operation of an enterprise providing the service specifies performance requirements of the service from an enterprise transactional perspective, and these requirements are automatically translated to a service requirement specification 424. I.e., the performance requirements are specified in terms of visible output seen by the enterprise and/or clients using the service. Such requirements could include any or all of the following:

(a) A type of service (e.g. on-line brokerage service);

(b) A transaction rate, which may be the number of transactions performed per unit time (e.g., number of trades per hour for an on-line brokerage service);

(c) A response time, which may be the average time a client waits for the data processing resources to perform a requested task (e.g., less than 0.5 seconds). There could be multiple tiers of response time depending on time of day, current transaction rate, etc.;

(d) An availability, which may be a percentage of time the service is available, and may be further qualified as a percentage of time during specified business hours; and (e) Any of various additional parameters involving system maintenance or auxiliary operations may be specified, such as time to complete maintenance or other operations, recovery time, and so forth.

Knowledge of such performance requirements does not demand the level of technical expertise which would typically be required for directly specifying service requirement specification data 425 as described above and illustrated in FIG. 5. Rather, what is required is knowledge of the marketplace and client expectations. It is expected that certain knowledgeable employees of the enterprise, with little or no technical expertise, may be able to provide this information. Such information could then be automatically translated to service requirement specification data 425 by maintaining data for each of a variety of different types of data processing services, and with respect to each service, identifying typical data processing resources needed to process an average transaction and similar essential data. With the input of transaction volume, a set of minimal resources required to process the expected volume within a required average response time can then be computed using standard queuing models, with additional resources added to account for maintenance and auxiliary operations.

As a further alternative for generating service requirement specification data 425, it would be possible to use empirical data from an actual configuration. This could be derived either historically or experimentally. For example, if historical data exists showing circumstances under which service became degraded (one or more data processing resources was not operational, or unusually high volume of transactions), this data could be used to identify minimum resource requirements. As a further example, a set of minimal resources could be derived experimentally by selectively disabling certain resources during actual operation of the system and observing results. Such experimentation will temporarily disrupt operations, but any such disruption will be very transient because, once degradation is detected, the disabled resource will be immediately restored to operation. As a further example, to avoid even transient disruption of operations, for some enterprises it would be possible to generate simulated transactional data and perform experimentation with different system configurations by requesting simulated transactions during non-business hours. Experimentation, either with real or simulated input transactions, could be performed by an automated monitoring tool which selectively disables different resources, records results, and determines critical resource levels needed to support the service.

Referring again to FIG. 7, configuration definition function 421 generates and records a configuration specification 424 for a configuration of data processing resources for which risk is to be evaluated (block 702). The configuration specification specifies the configuration of data processing resources to be used to provide the service, with somewhat greater specificity than the service requirements specification. The configuration specification is preferably in a form as illustrated in FIG. 6 and described above, although any of various alternative representations are possible.

Like the service requirement specification data, the configuration specification 424 can be generated either manually or by some automated mechanism. Preferably, configuration definition function 421 supports at least manual generation of the configuration specification data through one or more interactive data entry screens presented to a user. Manual entry of configuration data is particularly useful in generating a modified configuration specification from an existing configuration specification, e.g., to test the reliability of some hypothetical change to an existing configuration of data processing resources. Manual entry is possible in other cases, even when creating a configuration from scratch, although in view of the complexities of some configurations, it is desirable to employ an automated tool where an existing configuration is to be characterized. Tools which will query a set of data processing devices and determine a configuration therefrom are known in the art, and it is merely necessary to record such configuration data in an appropriate format for analysis as disclosed herein.

Risk evaluator 420 accesses reliability data to determine a predicted probability of failure for each resource identified in the configuration specification (block 703). Reliability data is preferably stored in database 402 and accessed by querying the data using one or more external APIs 413, although it could be stored elsewhere and/or accessed differently.

Reliability data may be derived from any of various sources. In one or more variations of a preferred embodiment, at least some reliability data is derived from field support data 403 maintained by a data processing support provider with respect to the same or similar resources, which includes not only the set of data processing resources being analyzed (which would provide a very small statistical sample), but generally includes all field installations for which the data processing support provider has data. Reliability data may additionally or alternatively be derived from manufacturer data and/or from publicly available sources. For example, considerable study has been made of the reliability of certain networks and network connections, from which reliability data for these resources may be derived. Reliability data may be stored in database 402 in a form which is directly usable by loss of service risk evaluator 420, e.g., as a predicted probability with respect to an applicable resource. It may alternatively be stored as raw data, from which a predicted probability of failure is derived. For example, the data in database 402 may include records of the total number of resources of a certain type in operation and each individual failure event, from which it is possible to derive an overall failure rate.

In one or more variations of a preferred embodiment, a predicted rate of failure of a software module is determined based on a current state in the development life cycle of the software module, as well as certain additional indicators, as explained in greater detail herein.

Figure 8:
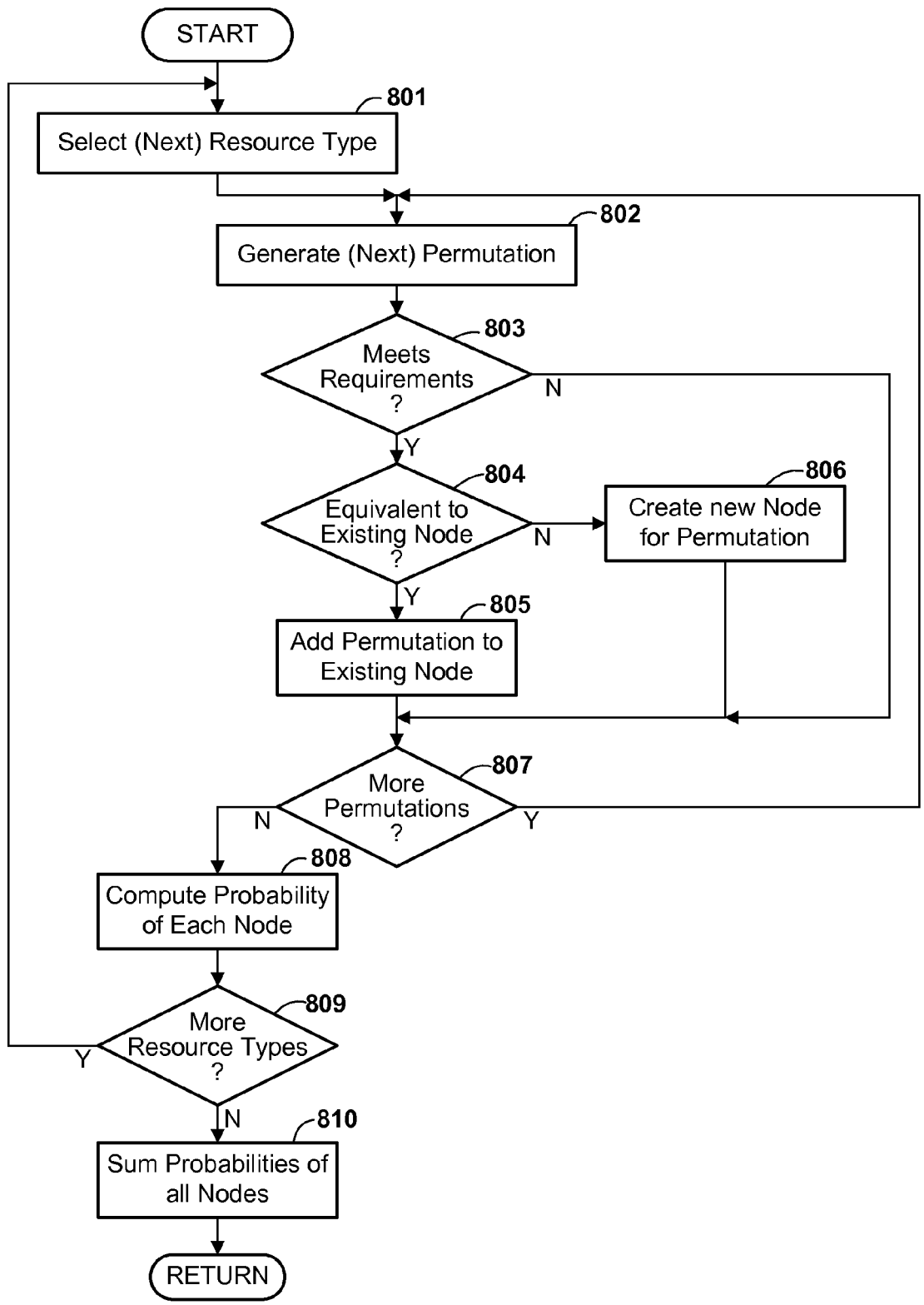
FIG. 8 is a flow diagram illustrating at a greater at level of specificity the actions performed to analyze a configuration defined by a configuration specification to determine a risk of service degradation, according to the preferred embodiment

The data processing configuration specified by configuration specification data 424 is analyzed using the reliability data and the service requirement specification data 425 to determine a risk of service loss/degradation (represented in FIG. 7 as block 704, and shown in greater detail in FIG. 8). A risk of service loss or degradation is a risk that the set of resources configured as specified in the configuration specification data will fail to meet the minimum requirements specified in the service requirement specification data. Unless otherwise qualified, the terms "service loss" and "service degradation" are used interchangeably herein, and could mean any failure, in whole or in part, to meet the minimum service requirements specified. To evaluate the risk of service loss/degradation, risk evaluation function 423 identifies possible combinations of resources which satisfy the service requirement specification and the respective probabilities associated with each.

In one embodiment, the analysis can be conceptualized as assigning a bit value (e.g. '1' for operational, '0' for not operational) to each resource of the set of resources identified in the configuration specification. The set of resources operational at any given time is represented by a corresponding bit vector, where each bit position corresponds to a respective resource. The probability of any single vector value (i.e. any single permutation of operational/non-operational for each resource) is the product of the probabilities that each individual resource will be in the corresponding state. Each permutation either satisfies the service requirements or it does not. Therefore, the probability that the set of resources identified in the configuration specification will satisfy the service requirements is the sum of the respective probability associated with each permutation which satisfies the service requirements.

If there are N resources identified in the specification, there are $2^N$ possible permutations of the bit vector. For very small values of N, it may be possible to simply examine all permutations, identify those which satisfy the requirements, and compute the probability of each such permutation, as explained above. It may appear that analysis would be difficult for larger values of N, but it will be observed that, for a typical configuration, even one with substantial redundancy, the vast majority of the permutations yield insufficient resources to satisfy the service requirements, and may thus be pruned to reduce the scope of the analysis. Additionally, various equivalent permutations may be combined to further reduce the scope.

FIG. 8 is a flow diagram illustrating at a greater at level of specificity the actions performed by a data processing support provider 103, and in particular a risk evaluation function 423 executing within one or more data processing systems of a data processing support provider, to analyze a configuration defined by a configuration specification to determine a risk of service degradation, according to the preferred embodiment.

Referring to FIG. 8, the risk evaluation function 423 selects a resource type (block 801), such as a core, a network adapter, a network, a storage device, etc. The risk evaluation function generates a "permutation" of the selected resource type (block 802), i.e, a unique state of the bit vector for each resource of the selected resource type.

The generated permutation is then compared with the resource requirements specified in resource requirements specification to determine whether it meets those requirements (block 803). If the requirements are not met (the 'N' branch from block 803), blocks 804-806 are skipped and the permutation is effectively pruned, i.e. no further permutations of other resource not yet selected need to be considered for this particular permutation of the selected resource, since minimum requirements are not met.

If, at block 803, the requirements are met (the 'Y' branch from block 803), the permutation is then compared with existing nodes, if any, at the current resource type level to identify any equivalents. An equivalent node is one associated with one or more equivalent permutations, i.e. permutations which may be considered equivalent for purposes of determining whether some other permutation of resource not yet selected meets the requirements. In other words, a permutation P1 of resources R(1) . . . R(J) is equivalent to a permutation P2 of resources R(1) . . . R(J) if any only if, for each and every permutation PX of resources R(J+1) . . . R(N) (where N is the total number of resources in the configuration), if permutation P1 combined with permutation PX satisfies the requirements, then permutation P2 combined with permutation PX also satisfies the requirements, and if permutation P1 combined with PX does not satisfy the requirements, then permutation P2 combined with PX also does not satisfy the requirements.

If an equivalent node exists (the 'Y' branch from block 804), the subject permutation is added to the existing node (block 805). If an equivalent node does not exist (the 'N' branch from block 804), a new node is created to represent the subject permutation (block 806).

The purpose of the test for equivalents at block 804 is to reduce the number of nodes for analysis, and the same logical result will be reached if blocks 804-805 are omitted entirely, although it may take significantly more time to analyze all nodes. It follows that any test for equivalent nodes performed at block 804 need not be exhaustive, and it is acceptable if it detects some equivalents but not all equivalents.

If there are more permutations of the currently selected resource type, the 'Y' branch is taken from block 807 and a next permutation is selected at block 802. When all permutations of the current resource type have been analyzed, the 'N' branch is taken from block 807.

A probability is then computed for each node (block 808). For a node having only a single permutation, the probability is the product of the individual probabilities of each resource state that the permutation represents. For a node having multiple permutations, the probability is logically the sum of the probabilities of each individual permutation. However, it is not necessarily required in this case that each individual permutation's probability be computed, and then summed. For example, a node may include a number of permutations which are identical except for a single bit position (or a set of bit positions, where all permutations of the set are included), and these may be combined as a single permutation having "don't care" values for the bits positions of the set. Other computational simplifications may be possible.

If more resource types remain to be analyzed, the 'Y' branch is taken from block 809, and a next resource type is selected for analysis at block 801. When all resource types have been thus analyzed, the 'N' branch is taken from block 809. All remaining nodes then represent permutations which satisfy the requirements, and the probabilities of these nodes are added to determine a composite probability that the requirements will be satisfied (block 810.

Referring again to FIG. 7, the risk evaluator then outputs the results of its analysis in any appropriate form to a user (block 705). Output could be presented visually on an interactive display screen, or printed as a hardcopy document, or output to a file for later retrieval, or any other form as required by the user.

The user may use the results of the analysis for any of various purposes. Quantifying risk is an important part of managing any business, and for obvious reasons, a user may wish to know what the risk is as a starting point in an effort to reduce the risk (e.g., by altering the configuration of the data processing resources), to mitigate the risk (e.g., by providing back-up systems or contingency plans to cope with the event of failure), to account for the risk (e.g., by procuring insurance or setting aside funds to cover losses), or otherwise take some action. Furthermore, it is often useful to quantify hypothetical risks in addition to actual risks. If an enterprise in planning to provide a service, or planning to alter the scope of a service, or planning to alter the data processing resources used to provide a service, hypothetical service requirements and/or data processing configurations could be analyzed as disclosed herein to determine risk of service loss, the results being useful not only for purposes disclosed above, but also for determining whether to embark on the proposed course of action.

Exemplary Analysis of Loss of Service Probability

An exemplary analysis of loss of service probability can be performed with respect to the exemplary configuration of FIG. 2 and exemplary configuration specification data of FIG. 6.

In this example, it will be assumed that servers 203B, 203C, 203D, 203E, 203F and 203G have identical hardware platforms and are identically configured with OS X and software applications App A, App B, and App C, and that the remaining servers 203A, 203H, 203I lack the required software (e.g., are not used for providing the service), and further that the processing capability of any four of these servers is sufficient to satisfy the service requirements specification 424. It will further be assumed that the bandwidth of any one network, any one router, and any one Internet connection is sufficient to handle all traffic needed to provide the service. It will further be assumed that storage devices 204A and 204B contain mirrored copies of the necessary data for providing the service, and that either device alone has sufficient storage to provide the service.

The analysis may begin by selecting the core 606 as the first resource to be analyzed (block 801). The core is an aggregated resource, containing hardware platform 607, OS 608, and applications 609, 610, 611. Since there are six cores (corresponding to the six servers 203B_G), there are $2^6$, or 64, possible permutations of operational/non-operational state. Each permutation is generated in turn (block 802). However, it will be noted that, of the 64 permutations, in only 22 are there at least four operational cores, so the other permutations are pruned immediately at block 803. Furthermore, since servers 203C-203F are identical, one may identify some of the 22 permutations as equivalents at block 804. By identifying equivalents, one can effectively reduce the number of nodes to eight, according to the number of cores which are operational from the set corresponding to servers 203C, 203D, 203E, 203F (i.e., those cores which are connectable to both LANs), the number operational (either 1 or 0) corresponding to server 203B (i.e, connectable to LAN1 only), and the number operational corresponding to server 203G (i.e., connectable to LAN2 only). These eight nodes are shown in Table 1 below.

TABLE 1

Nodes After Generating Core Permutations

| Node | Operational cores connectable to both LAN1 & LAN2 | Operational cores connectable to LAN1 only | Operational cores connectable to LAN2 only |
|---|---|---|---|
| 1 | 4 | 1 | 1 |
| 2 | 4 | 1 | 0 |
| 3 | 4 | 0 | 1 |
| 4 | 4 | 0 | 0 |
| 5 | 3 | 1 | 1 |

TABLE 1-continued

Nodes After Generating Core Permutations

| Node | Operational cores connectable to both LAN1 & LAN2 | Operational cores connectable to LAN1 only | Operational cores connectable to LAN2 only |
|---|---|---|---|
| 6 | 3 | 1 | 0 |
| 7 | 3 | 0 | 1 |
| 8 | 2 | 1 | 1 |

It will be observed that there are six permutations included in node 8, four permutations in each of nodes 5, 6, and 7, and one permutation in each of nodes 1, 2, 3, and 4. Thus, the probability associated with node 8, for example, is the sum of the probabilities for each of the six permutations it includes. This does not necessarily mean that the probability associated with node 8 is larger than other nodes. In fact, it is likely that the probability associated with node 1, having only a single permutation, is significantly larger than any other, since most individual resources have a high reliability.

Since a core is an aggregated resource, the probability that a single core resource will be operational is the product of the probabilities of each of its component parts, i.e. the product of the probability of the hardware platform, the probability of the OS, and the probabilities of each of App A, App B, and App C. A core or other aggregated resource could have a more complex topology that illustrated in FIG. 6. For example, a core might have multiple redundant hardware processing platforms supporting a single OS stack and application software stack for each application. In this case, the probability that the hardware processing platforms are operational is 1 minus the probability of multiple hardware failures. This would be multiplied by the probability for each of the software components that the respective component is operational. Since the various cores are identical, this computation need only be performed once.

After all permutations of core resources have been generated, pruned, and combined into nodes as required, the risk evaluation function takes the 'N' branch from block 809, the 'Y' branch from block 810, and selects a next resource type at block 801. In this example, it selects LAN adapter resources 605.

There are a total of 10 LAN adapters associated with the six core resources of interest, making a total of $2^{10}$, or 1024, permutations, and these are logically repeated for each of the 8 nodes. While more than 8000 permutations may appear large, the majority of these are pruned at block 803, or are equivalent to some other permutation at block 804. It will be observed that the significant operational feature of the permutations will be the number of operational nodes coupled to each LAN (i.e., coupled to the LAN by an operational LAN Adapter), and specifically whether or not the number equals or exceeds 4. As a result, only five nodes are required after considering all permutations, as summarized by Table 2 below:

TABLE 2

Nodes After Generating Core and LAN Adapter Permutations

| Node | Operational cores connected to both LAN1 & LAN2 | Operational cores connected to LAN1 | Operational cores connected to LAN2 |
|---|---|---|---|
| 1 | 4 | 4+ | 4+ |
| 2 | <4 | 4+ | 4+ |
| 3 | <4 | 4+ | <4 |
| 4 | <4 | <4 | 4+ |
| 5 | <4 | <4 | <4 |

In Table 2, the "Operational cores connected to LAN1" includes those connected to both LANs, and similarly for "Operational cores connected to LAN2". The notation "4+" signifies 4 or more cores, while the notation "<4" signifies fewer than 4. Node 5 encompasses those permutations in which the total number of cores connected to a LAN is at least 4, but neither LAN has 4 cores connected to it.

Although each node in Table 2 represents multiple permutations, it is not necessary to compute a probability for each permutation and add all probabilities together. For example, Node 1 represents the case where all cores and LAN Adapters in servers 203C, 203D, 203E and 203F are operational, which is computed as the product of the probabilities of these cores and LAN adapters. I.e., a multiplication of twelve values is required. It is not necessary to take into account the probabilities of operational or non-operational status for the remaining resources, because these are "don't cares" as far as node 1 is concerned. Other computational simplifications can be performed for each of the remaining nodes.

The risk evaluation function then selects LAN resources. There are two LANs, making four possible permutations for each of the five nodes listed above, or a total of 20 permutations. Only 11 of these permutations meet the minimum service requirements, and these may be further reduced to 7 by combining certain equivalents. These 7 resultant nodes are listed in Table 3 below.

TABLE 3

Nodes After Generating Core, LAN Adapter, and LAN Permutations

| Node | Operational cores connected to both LAN1 & LAN2 | Operational cores connected to LAN1 | Operational cores connected to LAN2 | LAN1 State | LAN2 State |
|---|---|---|---|---|---|
| 1A | 4 | 4+ | 4+ | 1 | 1 |
| 2A | <4 | 4+ | 4+ | 1 | 1 |
| 3A | <4 | 4+ | <4 | 1 | 1 |
| 4A | <4 | <4 | 4+ | 1 | 1 |
| 5A | <4 | <4 | <4 | 1 | 1 |
| 6 | X | 4+ | X | 1 | 0 |
| 7 | X | X | 4+ | 0 | 1 |

In Table 3, 'X' indicates a "don't care" value. It will be observed that nodes 1A through 5A are obtained by concatenating the LAN states '1 1' to nodes 1 through 5, respectively of Table 2. Node 6 results from either node 1, 2 or 3 from Table 2, concatenated with the LAN states '1 0', and node 7 results from either node 1, 2 or 4 from Table 2, concatenated with the LAN states '0 1'. Where only one LAN is operational, the only relevant consideration is the number of operational cores connected to that LAN.

Thus, although there are logically $2^{18}$, or in excess of 260,000, possible permutations of core, LAN adapter, and LAN resources, these can be reduced to only seven nodes representing the different effective possibilities.

The remaining resources, i.e. storage 603, router 601, and Internet connection 602, are analyzed similarly, and the corresponding tables are omitted herein for brevity of description.

Predicting Reliability of a Software Resource

Software related problems which may result in unavailability may have various causes. There may be defects to the software requiring that the code itself be corrected, referred to herein as code defects. But many problems during code execution which do not necessarily require code correction or are not necessarily even correctable by changes to specific defective sections of the code or the fault of any single software program or module, and result from interaction of various software modules, limitations of available memory and other resources, improper configuration or other use of the software by the user, and so forth. For example, accumulation of obsolete memory objects in a heap, having too many active processes, many of which may be idle and unused most of the time, and so forth, may result in performance degradation to the point of effective denial of service. Some of these problems may be correctable by re-initializing the system, by cleaning up memory, by closing unused processes, by re-balancing resources, or any number of other interventions. Specifically, some problems may be corrected, at least temporarily, by interventions other than alteration of the software itself.

Typically, software exhibits a relatively larger number of problems causing unavailability when it is first placed in use, and over time the occurrences of these problems diminishes, without disappearing altogether. The diminishing rate of problems attributable to specific software is partially due to the fact that code defects are identified and corrected (with code updates, patches, etc.), and further due to identification and correction of configuration or other user errors. However, the rate of software unavailability does not typically drop to zero, because, as noted certain problems are simply inherent in the operation of the software and/or too difficult to correct.

One method for calculating the probability of software availability or unavailability is to collect statistics concerning the number of a software product installed in production installations (i.e., in installations where it is used for its intended purpose, as opposed to experimental, testing, development, and similar installations), the individual instances of failure events in those installations, and length of unavailability as a result. From this data it is possible to compute an average availability or unavailability of the software product in the field.

However, since as pointed out above, software problems tend to diminish over time, an aggregate average of all failures in all installations will include a rash of early failures, and will tend to exaggerate the actual rate of failure in many cases. A more accurate estimate of software reliability can be obtained taking into account the life cycle behavior of software.

In one or more variations, life cycle behavior is taken into account by filtering those failure events for which the cause has already been identified and corrected, and computing a probability of availability or unavailability from the filtered results. Where the data processing support provider is also the source or provider of the software, it is likely that the data processing support provider will maintain thorough records concerning software-related failure events. If a code fix has already been implemented to correct one or more defects which were identified after release of the software product, then it is reasonable, in projecting future rate of failure of the software product based on past events, to exclude those events resulting from the particular one ore more defects which were corrected in the code fix. It is similarly reasonable to exclude events resulting from improper initial installation or configuration of the software, if the software has already been configured and installed in the system configuration being evaluated. Accordingly, in one variation of the preferred embodiment, the configuration data includes data specifying the specific software version, including all fixes installed, and software reliability is projected by filtering failure events which have been corrected and/or result from improper initial installation or configuration.

However, the data required for filtering individual events will not necessarily be available. The subject software may be provided by third parties which do not wish to share their data, or such data may be otherwise unavailable. In one or more additional variations of the preferred embodiment, software reliability can be predicted based on typical life cycle behavior combined with such data as may be available.

Figure 9:
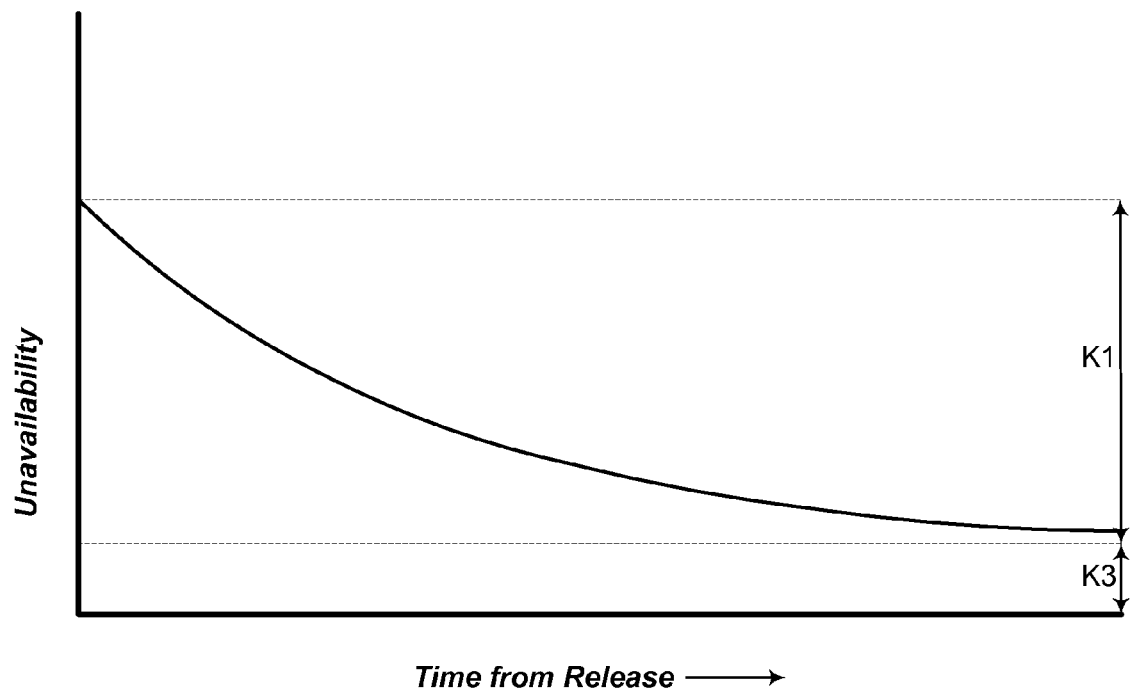
FIG. 9 illustrates a typical profile showing how a rate of unavailability of an executing instance of a software product is related to time from release of the product.

FIG. 9 illustrates a typical profile showing how a rate of unavailability of an executing instance of a software product may is related to time from release of the product. As shown, a relatively larger unavailability is associated with the time immediately following release of the product, and this rate declines over time and eventually levels off. A typical profile such as represented in FIG. 9 may be characterized as the sum of a decaying exponential and a constant, e.g., $$U = K1 * e^{K2 \cdot t} + K3, \qquad (1)$$

where U is unavailability (expressed as a percentage), t is time, and K1, K2 and K3 are positive real coefficients. The probability of availability of the software is then (1 ! U).

Software reliability may be projected based on equation (1) above by deriving values for the coefficients K1, K2 and K3. Such coefficient values may be derived using one or more of the following techniques, alone or in combination.

In one variant, one or more of the coefficients are derived by obtaining a "best fit" of U as defined by equation (1) to field data for the subject software.

In another variant, one or more of the coefficients are derived from historical data with respect to failure events of the same or other software modules. Such historical data could be for the software industry in general, or for software executing on a particular platform of hardware or hardware/operating system, or for software written by a particular vendor. Furthermore, where there have been previous versions of the same software product, failure data with respect to those previous versions could be used, either exclusively or in conjunction with other failure data (e.g., by weighting failure data for previous versions of the same product more significantly than failure data from other software products).

In another variant, one or more of the coefficients are derived by correlating a measure of software quality during development and/or software size or complexity to field reliability. This variant may be particularly useful in predicting an initial rate of unavailability or other measure of reliability upon release of the software product. For example, immediately prior to or shortly after release of a software product, the sum of coefficients K1+K3 may be projected based on the defect rate observed during development and/or size complexity of code, such as number of lines of code. Statistical data for previously released software modules can correlate defect rate (or other quality measure) during development with unavailability upon release, and such statistical data may also correlate size (e.g. lines of code) with unavailability upon release. Either one of these measures yields a projected unavailability according to the observed defect rate (or other quality measure) during development, or the size, of the subject software module for which unavailability is to be predicted. Either of these measures could be taken as the predicted unavailability, or a weighted average of the two measures could be taken as the predicted unavailability.

In one exemplary variation, software quality measurements and/or size/complexity measurements as described above are used to project initial reliability, i.e. the sum K1+K3. The time coefficient value K2 is of less importance initially, and a value may be assumed based on typical software industry behavior. The value K3 may further be derived by correlating software module size with K3, i.e. by correlating module size with unavailability data for software modules which are mature in a development life cycle. These are sufficient to provide an initial projection of reliability of the subject software module. As actual field data begins to after release of the software, the model can be incrementally adjusted based on the actual field data. The initial adjustment or adjustments may provide a weighted average of unavailability predicted using the model and unavailability predicted using only the field data. This weighting will initially give greater weight to the model, and as more and more field data is obtained, the model's weight will diminish, to the point where the model is eventually discarded altogether in favor of field data.

Other Considerations

Although a series of steps has been described above as a preferred embodiment, it will be appreciated that many variations of a process for determining risk of service loss are possible, and in particular that some steps may be performed in a different order, that different data structures may be used, and that other or additional steps may be taken. In particular, it will be appreciated that service requirement specification data and configuration specification data may be generated in any order or concurrently, and that reliability data could be accessed before or after analysis of certain failure permutations.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 3 as system memory 302 and data storage devices 325-327.

Unless inconsistent with the invention or otherwise qualified herein, computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:
1. A method for evaluating degradation of service risk for a service provided by at least one digital data processing device, comprising:

recording in a data processing system a service requirements specification for a service, said service being a service provided by a set of digital data processing resources on behalf of at least one client, said service requirements specification specifying a plurality of digital data processing resources required to provide said service;

recording in a data processing system a configuration specification, said configuration specification specifying a configuration of digital data processing resources of a service provider available to provide said service on behalf of said at least one client, said configuration specification being independent of said service requirements specification;

automatically accessing, with a data processing system, reliability data for digital data resources specified in said configuration specification;

using said service requirements specification, said configuration specification, and said resource reliability data to automatically determine, with a data processing system, a risk of degradation of the service specified in said service requirements specification when provided by the configuration of digital data processing resources specified in said configuration specification, the risk of degradation of the service being a risk that less than all of the plurality of digital data processing resources specified in said service requirements specification will be available to provide the service; and providing results of said using said service requirements specification, said configuration specification, and said resource reliability data to automatically determine a risk of degradation of the service to a user.

2. The method of claim 1, wherein said plurality of digital data processing resources required to provide said service specified in said service requirements specification includes at least one software module.

3. The method of claim 1, wherein said service comprises the maintenance of at least one web page on the Internet for access by said at least one client.

4. The method of claim 1, wherein said configuration specification specifies a set of redundant resources, wherein loss of any single resource of the set of redundant resources does not cause degradation of said service.

5. The method of claim 1, wherein said reliability data comprises data derived from field support data gathered from supporting resources of a first digital data processing resource type, wherein at least one digital data processing resource specified by said configuration specification is of said first digital data processing resource type.

6. The method of claim 1, wherein said service requirements specification comprises an abstract definition of a data processing system for providing the service.

7. The method of claim 6, wherein said service requirements specification comprises a plurality of abstract resource definitions, each abstract resource definition defining a respective resource requirement for a corresponding resource.

8. The method of claim 7, wherein at least one of said abstract resource definitions comprises a quantitative value specifying a minimum amount of the corresponding resource required to provide the service.

9. A method for evaluating degradation of service risk for a service provided by at least one digital data processing device, comprising:

recording in a data processing system a service requirements specification for a service, said service being a service provided by a set of digital data processing resources on behalf of at least one client, said service requirements specification specifying a plurality of digital data processing resources required to provide said service;

recording in a data processing system a configuration specification, said configuration specification specifying a configuration of digital data processing resources of a service provider available to provide said service on behalf of said at least one client;

automatically accessing, with a data processing system, reliability data for digital data resources specified in said configuration specification;

using said service requirements specification, said configuration specification, and said resource reliability data to automatically determine, with a data processing system, a risk of degradation of the service specified in said service requirements specification when provided by the configuration of digital data processing resources specified in said configuration specification; and providing results of said using said service requirements specification, said configuration specification, and said resource reliability data to automatically determine a risk of degradation of the service to a user;

wherein using said service requirements specification, said configuration specification, and said resource reliability data to automatically determine, with a data processing system, a risk of degradation of the service specified in said service requirements specification when provided by the configuration of digital data processing resources specified in said configuration specification comprises:

generating a plurality of resource states of resources identified in said configuration specification;

pruning resource states which do not meet requirements of said service requirements specification; and using said resource reliability data to automatically assign a probability to unpruned resource states.

10. The method of claim 9, wherein using said service requirements specification, said configuration specification, and said resource reliability data to automatically determine, with a data processing system, a risk of degradation of the service specified in said service requirements specification when provided by the configuration of digital data processing resources specified in said configuration specification comprises:

(a) selecting a resource type of resources identified in said configuration specification;

(b) generating a plurality of resource states corresponding to resources of the selected type identified in said configuration specification;

(c) pruning generated resource states which do not meet requirements of said service requirements specification; and repeating said (a), (b) and (c) until all resource types have been analyzed.

11. The method of claim 10, wherein using said service requirements specification, said configuration specification, and said resource reliability data to automatically determine, with a data processing system, a risk of degradation of the service specified in said service requirements specification when provided by the configuration of digital data processing resources specified in said configuration specification further comprises:

combining a plurality of equivalent said resource states to form a node;

wherein using said resource reliability data to automatically assign a probability to unpruned resource states is performed with respect to said node after combining said plurality of equivalent said resource states to form said node.

12. A method for evaluating degradation of service risk for a service provided by at least one digital data processing device, comprising:

recording in a data processing system a service requirements specification for a service, said service being a service provided by a set of digital data processing resources on behalf of at least one client, said service requirements specification specifying a minimum of a plurality of digital data processing resources required to provide said service;

recording in a data processing system a configuration specification, said configuration specification specifying a configuration of digital data processing resources of a service provider available to provide said service on behalf of said at least one client, said configuration specification being independent of said service requirements specification;

automatically accessing, with a data processing system, reliability data for digital data resources specified in said configuration specification;

using said service requirements specification, said configuration specification, and said resource reliability data to automatically determine, with a data processing system, a risk of degradation of the service specified in said service requirements specification when provided by the configuration of digital data processing resources specified in said configuration specification, the risk of degradation of the service being a risk that the configuration of digital data processing resources specified in said configuration specification will fail to meet the minimum of the digital data processing resources required to provide said service specified in said service requirements specification; and providing results of said using said service requirements specification, said configuration specification, and said resource reliability data to automatically determine a risk of degradation of the service to a user.

13. The method of claim 12, wherein said plurality of digital data processing resources required to provide said service specified in said service requirements specification includes at least one software module.

14. The method of claim 12, wherein said service comprises the maintenance of at least one web page on the Internet for access by said at least one client.

15. The method of claim 12, wherein said configuration specification specifies a set of redundant resources, wherein loss of any single resource of the set of redundant resources does not cause degradation of said service.

16. The method of claim 12, wherein said reliability data comprises data derived from field support data gathered from supporting resources of a first digital data processing resource type, wherein at least one digital data processing resource specified by said configuration specification is of said first digital data processing resource type.

17. The method of claim 12, wherein said service requirements specification comprises an abstract definition of a data processing system for providing the service.

18. The method of claim 17, wherein said service requirements specification comprises a plurality of abstract resource definitions, each abstract resource definition defining a respective resource requirement for a corresponding resource.

19. The method of claim 18, wherein at least one of said abstract resource definitions comprises a quantitative value specifying a minimum amount of the corresponding resource required to provide the service.

* * * * *